United States Patent Office 3,168,542
Patented Feb. 2, 1965

3,168,542
PROCESS FOR SEPARATING MIXTURES OF
CHLOROSILANES
Lloyd H. Shaffer, Snyder, N.Y., assignor to Union Carbide Corporation, a corporation of New York
No Drawing. Filed May 15, 1957, Ser. No. 659,204
23 Claims. (Cl. 260—448.2)

This invention relates to chlorosilanes and in particular to a process for separating specific chlorosilanes from mixtures of different chlorosilanes.

It is often desirable to separate mixtures of chlorosilanes of different functionalities into chlorosilane portions such that each portion contains only chlorosilanes of a specific functionality and is substantially uncontaminated by chlorosilanes of other functionalities. Illustratively, it has been found that dimethylpolysiloxane gums that are suitable for conversion to silicone elastomers cannot be prepared directly by the hydrolysis of dimethyldichlorosilane prepared in the usual manner without further treatment. One explanation for the difficulty encountered is that the starting dimethyldichlorosilane is rarely, if at all, obtained in a pure form. That is, it contains methyltrichlorosilane in an amount of 0.3 to 0.5 mole percent or more based on the total moles of methyltrichlorosilane and dimethyldichlorosilane even when careful purification procedures have been employed. Thus, upon hydrolysis of the starting silane and dehydration of the resulting silanol, a pure difunctional siloxane product is rarely obtained. Any trifunctional silane impurities present are converted to trifunctional siloxane groups, such as monomethylsiloxane groups, resulting in the cross-linking of the siloxane chains of the products. Such cross-linking of the siloxane chains of the products due to the presence of the trifunctional silane prevents the production of the soft gums into which fillers can be milled. It has been found that amounts of combined monomethylsiloxane groups of more than from about 0.01 part to about 0.02 part by weight per 100 parts by weight of the monomethylsiloxane groups, dimethylsiloxane groups and trimethylsiloxane groups that are combined in the siloxane products prevent the use of the product as as siloxane gum which can be subseqently converted to desirable silicone elastomers. Amounts of combined monomethylsiloxane groups equal to or less than these amounts were not found to prevent the use of the product as a siloxane gum which can be subsequently converted to desirable elastomers.

Similarly, by way of illustration, trimethylchlorosilane, when produced by conventional means usually contains up to about 40 mole percent of chlorosilanes of higher functionality, e.g., tetrachlorosilane (i.e. silicon tetrachloride) and methyltrichlorosilane, based on the total moles of trimethylchlorosilane and such higher functional chlorosilanes. Trimethylchlorosilane is utilized for furnishing end-blocking groups (i.e. chain-terminating trimethylsiloxane groups) in the manufacture of silicone oils that consist predominantly of combined dimethylsiloxane units. The viscosity and tendency to gel of oils containing end-blocking groups furnished by trimethylchlorosilane decreases as the amounts of tri- and tetra-functional chlorosilanes in the trimethylchlorosilane so used are reduced. Hence, it is desirable to reduce the amount of tri- and tetra-functional chlorosilanes in trimethylchlorosilane so that oils of low viscosity containing end-blocking groups furnished by trimethylchlorosilane can be manufactured without gelation.

It is also often desired to separate mixtures of chlorosilanes having different organic substitutents attached to silicon thereof into individual chlorosilane portions wherein each portion contains specific chlorosilanes having the same organic substituents attached to silicon thereof. Illustratively, in the manufacture of vinyl silicone elastomers the proportion of vinyl groups contained by the elastomer affects the properties of the elastomers. By controlling the amount of vinyl siloxane groups combined in the elastomers, the properties of such elastomers can be controlled substantially as desired. This can be advantageously accomplished by regulating the relative amounts of substantially pure vinyl chlorosilanes and coreacting chlorosilanes. When low purity chlorosilanes are employed additional variables are encountered thus complicating an otherwise simple operation. Similarly, substantially pure diphenyldichlorosilane, dimethyldichlorosilane, methylphenyldichlorosilane, and the like are highly desirable.

Various processes had been suggested heretofore for separating mixtures of different chlorosilanes such as, mixtures of dimethyldichlorosilane and methyltrichlorosilane. These processes were not found to be entirely satisfactory for several reasons including incomplete separations, low yields and/or inability to separate low concentrations of chlorosilanes from the mixtures. Known physical methods, such as distillation, are often not well suited for the separation of mixtures of different chlorosilanes. By way of illustration, tetrachlorosilane and trimethylchlorosilane form an azeotrope and hence cannot be separated from each other by simple distillation. As a further illustration, some chlorosilanes, such as dimethyldichlorosilane and methyltrichlorosilane, boil at close to the same temperature and also are not readily separated from each other by simple distillation.

In order to separate mixtures of chlorosilanes, it had been proposed, heretofore, that a mixture containing two or more chlorosilanes and a compound such as a tertiary amine, a diorganodiacyloxysilane or an alkali metal hydroxide can be mixed and subjected to such conditions that one or more, but not all of the chlorosilanes react with the amine, the diorganodiacyloxysilane or the hydroxide to form products that are appreciably higher boiling than the remaining unreacted chlorosilane or chlorosilanes. The remaining unreacted chlorosilane or chlorosilanes can then be removed from the reaction mixture by distillation. These latter-mentioned means of separating mixtures of different chlorosilanes are not entirely satisfactory because of incomplete separation, low yields and inability to remove small concentrations of chlorosilanes from the mixtures. The method wherein a tertiary amine is employed was not found to be generally applicable to separating all mixtures of chlorosilanes but is limited to separating mixtures of inorganic chlorosilanes. Diorganodiacyloxysilanes are not readily available materials and hence the process for separating mixtures of chlorosilanes using diorganodiacyloxysilane entails the expenses of first synthesizing said diorganodiacyloxysilanes. When an alkali metal hydroxide is used in such separations, the materials obtained are higher boiling and are not found to be especially useful because of their basic character and contamination by salts.

It had been suggested also that zinc fluoride can be added to a mixture of two chlorosilanes to selectively convert one of the chlorosilanes to the corresponding fluorosilane. The fluorosilane so made could then be separated from the unreacted chlorosilane by distillation. However, the fluorosilane so separated is not a particularly useful material in view of the fact that when it is subjected to hydrolysis reaction in the course of the production of polysiloxane materials therefrom, hydrogen fluoride is produced which is highly corrosive.

Still another process for separating mixtures of chlorosilanes had been suggested and includes adding a phenol to the mixture containing two or more chlorosilanes and applying such conditions that cause the chlorosilanes and the phenol to react to form phenoxysilanes. The phenoxysilanes so made possess larger boiling point differences than the starting chlorosilanes and hence can be separated by distillation. However, the relatively high boiling points of these phenoxysilanes necessitate the use of high temperature distillation or vacuum distillation to effect a separation and regeneration of the separated phenoxysilanes to the corresponding chlorosilanes is required. Hence this method of separating mixtures of chlorosilanes is often undesirable.

Another process for separating mixtures of methylchlorosilanes had been suggested and includes adding an anhydrous salt of acetic acid to the mixture containing two or more chlorosilanes and applying such conditions that cause the methylchlorosilanes and the salt to react to form methylsilylacetates. The methylsilylacetates possess larger differences in their boiling points than the starting methylchlorosilanes and hence can be separated by distillation. However, the relatively high boiling points of these methylsilylacetates necessitate the use of high temperature or vacuum distillation to effect a separation and hence this method of separating mixtures of chlorosilanes is often undesirable.

In the case of purifying dimethyldichlorosilane, it was found that known processes for separating dimethyldichlorosilane from the methyltrichlorosilane did not adequately purify the dimethyldichlorosilane so that it might be readily used in the production of viscous oils and silicone elastomers.

To overcome the difficulties encountered in the preparation of the desired dimethylpolysiloxane gums it has become general practice to prepare cyclic dimethylsiloxane intermediates which can to some extent be separated from contaminating trifunctional impurities and which can be subsequently equilibrated to produce a pure high molecular weight linear polysiloxane such as is used in the production of the desired siloxane oils and siloxane gums. These intermediates may be produced by a hydrolysis-dehydration procedure employing impure difunctional dimethylsilanes under conditions that are carefully controlled so as to cause a maximum yield of the desired cyclic dimethylsiloxane product. The cyclic dimethylsiloxane intermediates are then distilled from the reaction mixture leaving some of the combined monofunctional and trifunctional siloxane groups behind. Once distilled, the difunctional intermediates can be further processed to siloxane oils and siloxane gums. However, this method of making such difunctional intermediates has limitations illustrative of which are low yields of the difunctional products and incomplete separation of compounds containing combined trifunctional siloxane groups from the difunctional siloxane product.

To accomplish the production of cyclic dimethylsiloxane intermediates that can be converted to the desired siloxane gums another process had been suggested. This second process is similar to the above-mentioned hydrolysis-dehydration procedure inasmuch as impure difunctional dimethylsilanes are hydrolyzed and the silanols so formed are dehydrated. The dehydrated material is treated further to produce a high molecular weight polysiloxane. The contaminated polysiloxane so formed is then heated in the presence of an alkaline catalyst at a temperature of about 270° C. to cause depolymerization or a rearrangement of the difunctional siloxane groups to form cyclic dimethylsiloxanes which are distilled from the reaction mixture leaving some of the combined monofunctional and trifunctional siloxane groups behind. However, this method of producing the desired intermediates is not adequate. By way of illustration, this method produces cyclic dimethylsiloxanes that are still contaminated by materials containing combined trifunctional siloxane groups. Furthermore, the high temperature often employed causes decomposition and disproportionation reactions which lower the yield of the difunctional products and which produce undesired solid products that must be periodically removed from the reactor. In addition, under the conditions employed in this method, the equilibrium concentration of the difunctional intermediates is usually low and, when operated in a batchwise manner, this method inherently produces a low yield of the difunctional intermediates.

This invention is based on the discovery that different chlorosilanes hydrolyze at different rates and that mixtures of different chlorosilanes can be separated into specific chlorosilane portions which are substantially free of other chlorosilanes by taking advantage of this difference in reactivity. In accordance with this invention, it has been found that the separation of chlorosilane mixtures containing a first chlorosilane part and a second chlorosilane part, the first chlorosilane part being more readily hydrolyzable than the second chlorosilane part, can be accomplished by a process which comprises reacting the chlorosilane mixture with not less than 0.5 mole of water per mole of the first chlorosilane part to form a mixture of a hydrolyzed chlorosilane part and an unhydrolyzed chlorosilane part, and separating the unhydrolyzed and hydrolyzed chlorosilane parts. Each chlorosilane part can contain a single specific chlorosilane or several specific chlorosilanes all of which hydrolyze at rates above or below a certain value which distinguishes the first chlorosilane part from the second chlorosilane part. For example, the specific chlorosilane or chlorosilanes of the first chlorosilane part hydrolyze at a rate above a certain value whereas the specific chlorosilane or chlorosilanes of the second chlorosilane part hydrolyze at a rate below that value. When the second chlorosilane part comprises more than one specific chlorosilane, the process can be repeated to eliminate the more hydrolyzable chlorosilanes of said mixture. The process can be repeated as many times as desired or until a single specific chlorosilane has been obtained.

Our process is applicable to all mixtures of chlorosilanes, wherein the chlorosilanes differ in rates of hydrolysis. Among the many chlorosilane mixtures that can be separated by this invention are mixtures of the chlorosilanes represented by the formula:

$$ClSiX_3$$

wherein X is a chlorine atom, a hydrogen atom or a monovalent hydrocarbyl group, particularly, an alkyl group, an aryl group, an alkenyl group or an aralkyl group but is preferably a chlorine atom, a methyl group, an ethyl group, a vinyl group or a phenyl group. By the term "hydrocarbyl group," as used herein, is meant a monovalent group composed of carbon and hydrogen. However, the hydrocarbyl groups represented by X in the formula can be substituted or unsubstituted and, if substituted, the substituents can be silyl groups (e.g. a trichlorosilyl group), cyano groups, halogen atoms, and the like. X can be the same or different throughout a particular chlorosilane molecule. Illustrative of the chlorosilane represented by the formula are tetrachlorosilane, the alkylchlorosilanes, the arylchlorosilanes, the aralkylchlorosilanes, the alkenyldichlorosilanes, the chlorohydrogensilanes and the like. This invention is especially applicable to the separation of mixtures of chlorosilanes that contain two or more members of the following classes of chlorosilanes: the methylchlorosilanes, the ethylchlorosilanes, the phenylchlorosilanes, the vinylchlorosilanes, the phenylmethylchlorosilanes, and the ethyl-phenylchlorosilanes, as well as to the separation of chlorosilane mixtures of one or more members of these classes and tetrachlorosilane. Illustrative of the mixtures of chlorosilanes that can be separated using the process of this invention are mixtures of trimethylchlorosilane and tetrachlorosilane, mixtures of dimethyldichlorosilane and methyltrichlorosilane, mixtures of phenylmethyldichlorosilane, phenyltrichlorosilane and diphenyldichlorosilane and like mixtures. Although our process will separate chlorosilane mixtures containing any percentages of specific chlorosilanes, it is preferable to remove as much as possible of the more readily hydrolyzable chlorosilane part by fractional distillation or other practical methods so as to concentrate the less hydrolyzable chlorosilane part. This technique results in economies and higher yields of unhydrolyzed chlorosilanes. For example, $Me_2SiCl_2$ containing 5 mole percent of $MeSiCl_3$, and $Me_3SiCl$ containing as much as 40 mole percent of more readily hydrolyzable impurities have been advantageously purified using this process.

Chlorosilanes, such as those represented by the formula, were found to hydrolyze at different rates. By way of illustration, it was found that methyltrichlorosilane is hydrolyzed faster than dimethyldichlorosilane, and tetrachlorosilane is hydrolyzed faster than trimethylchlorosilane. The following relative reaction rates at about —20° C. were determined from a series of hydrolysis rate measurements:

| Chlorosilane: | Relative rates of hydrolysis |
|---|---|
| $CH_3SiCl_3$ | 0.59 |
| $C_2H_5SiCl_3$ | 1.00 |
| $C_6H_5SiCl_3$ | 2.10 |
| $N\equiv C(CH_2)_2SiCl_3$ | 120.00 |
| $(CH_3)_2SiCl_2$ | 0.00006 |
| $(C_6H_5)_2SiCl_2$ | Slower than $(CH_3)_2SiCl_2$ |

The hydrolysis rates of the chlorosilanes present in any chlorosilane mixture to be separated by this invention can be readily measured by known procedures. By way of illustration, the rates of hydrolysis of chlorosilanes can be measured conductometrically as well as by infrared techniques in accordance with methods known in the art.

Not wishing to be bound by any theory or mechanics of reaction, it, nevertheless, is believed that in our process the more readily hydrolyzable chlorosilane part preferentially hydrolyzes before any hydrolysis of the less readily hydrolyzable chlorosilane part. In this reaction the more readily hydrolyzable chlorosilane part is converted into a silanol (or silanol mixture) which contains at least one silicon bonded hydroxyl group per molecule. The silanol (or silanol mixture) thus formed is not usually stable and usually reacts further with a chlorosilane to form a siloxane (or siloxane mixture) and hydrogen chloride which advantageously is rendered ineffective by removal or other means to prevent undesirable side-reactions which may be encouraged by its presence. Whether the silanol is stable or undergoes reaction to form a siloxane or not is immaterial for the purposes of this invention since both the silanol and siloxane differ in physical properties from the unhydrolyzed chlorosilane part and separation thereof can be easily accomplished by conventional means, as by fractional distillation. Hence, for the purposes of simplification, the hydrolyzed chlorosilane part can be considered as either a silanol, silanol mixture, siloxane and/or siloxane mixture. Hydrogen chloride can be rendered ineffective in encouraging undesirable side reactions by promoting its evolution from the reaction mixture with sub-atmospheric pressures, by adding a tertiary amine to combine with hydrogen chloride to form an inert salt or by any other suitable means. It may not be desirable to employ a tertiary amine for such purposes if the amine is capable of reacting with any component of the reaction mixture other than HCl.

There are many ways of separating the unhydrolyzed chlorosilane part from the silanol (or silanol mixture) and/or the siloxane (or the siloxane mixture) formed in our process. By way of illustration, a liquid organic compound in which the unhydrolyzed chlorosilane part is soluble and in which the silanol and/or siloxane (or mixtures thereof) are not soluble can be added to the reaction mixture and the unhydrolyzed chlorosilane part can be separated from the reaction mixture by extraction. The preferred means of separating the unhydrolyzed chlorosilane part from the reaction mixture is by heating the reaction mixture to a temperature sufficiently elevated to volatilize the unhydrolyzed chlorosilane part thereby leaving the silanol and/or siloxanes (or mixtures thereof) as a residue. Heating the reaction mixture to volatilize the unhydrolyzed chlorosilane part can be conducted at high or low pressures and/or at or below the boiling point of the reaction mixture. The process of this invention can be repeated as many times as desired using the unhydrolyzed chlorosilane part obtained in each previous run so as to obtain a single chlorosilane which is substantially pure.

In order for our process to operate efficiently, the water and chlorosilane mixture should be in intimate reactive contact with one another. In other words, they should form a uniform reaction mixture or solution so as to react under homogeneous conditions. Most chlorosilanes are not miscible with water and in these instances a suitable common solvent is advantageously employed. Suitable common solvents are those with which both the chlorosilane mixture and water are miscible and include dioxane, diethyl ether, tetrahydrofuran, diethylene glycol diethers, and the like. When a common solvent is employed, the amount thereof is not critical as long as it is sufficient to maintain a uniform reaction mixture and it is not so great that dilution or low concentration impractically retards the rate of hydrolysis. From about 5 parts to 500 parts by weight of common solvent per 100 parts of the aggregate weight of water and chlorosilane mixture have been found to be efficient. Excellent results have been obtained in the experiments we have conducted by using from 20 parts to 200 parts by weight of common solvent per 100 parts of the aggregate weight of water and chlorosilane mixture. Higher or lower proportions of common solvent may be required depending upon the particular chlorosilane mixture and the particular common solvent employed. More than one common solvent can be employed in our process. Solvents which are miscible with only water or only the chlorosilane mixture may be employed, if the solutions with such solvents are miscible. For example, solvents for water but not for the chlorosilane mixture and solvents for the chlorosilane mixture but not for water are useful as long as the particular water solution and the particular chlorosilane solution formed thereby are miscible. In this connection, the term "solvent," as used herein, means a single solvent or a mixture of solvents by the use of which in our process a homogeneous reaction mixture containing said chlorosilane mixture and water is obtained. When the chlorosilane mixture and water are miscible, a common solvent is not required, although one may be used, if desired.

The proportion of water employed in this invention need not be narrowly critical. Theoretically, 0.5 mole of water is sufficient to react with one mole of the more readily hydrolyzable chlorosilane part whereas lesser amounts will result in unhydrolyzed chlorosilane parts which contain some of said more readily hydrolyzable chlorosilanes. Hence, at least 0.5 mole of water per mole of the more readily hydrolyzable chlorosilane part (this being the stoichiometric amount of water) is required for substantially complete separation of the two chlorosilane parts. Lesser amounts of water can be used, of course, if complete separation is not desired. For practical reasons, more than 5 moles of water per mole of the more readily hydrolyzable chlorosilane part are not necessary. Although amounts greater than 5 moles per mole can be employed, if desired, no commensurate advantage is seen to be obtained. In fact, such greater water can be troublesome insofar as securing high yields of the less readily hydrolyzable chlorosilane part is concerned. At water amounts above 5 moles per mole, care should be devoted to reaction temperature and reaction time since both influence the yield of the less readily hydrolyzable chlorosilane part as will be explained hereinafter. We have found that water amounts of 1 mole to 3 moles of water per mole of the more readily hydrolyzable chlorosilane part provide excellent separation, particularly, when said chlorosilane part contains chlorosilanes of high hydrolysis rates.

The temperature at which our process is conducted is not narrowly critical. The lowest practical temperature is, of course, the freezing point of the water-chlorosilane reaction mixture or the temperature at which the rate of hydrolysis is so low as to be impractical. The highest practical temperature, of course, is that temperature at which the relative rates of hydrolysis of the specific chlorosilanes in the chlorosilane mixture become substantially indistinguishable. The relative rates of hydrolysis of chlorosilanes appear to be more widely separated at the lower temperatures, and at the higher temperatures the yield of unhydrolyzed chlorosilanes tends to decrease because of hydrolysis. Accordingly, our process is advantageously carried out at temperatures below about 100° C. and above about −78° C. Superatmospheric pressures may be employed in our process at the high temperatures, if desired, to prevent the evolution of gaseous water or chlorosilanes. We have found that when our process is conducted at temperatures in the range of about −40° C. to +30° C. excellent results by way of high yields and short reaction times are obtained.

Reaction times also are not narrowly critical in the practice of our process. The reaction time can be varied in accordance with needs and desires with respect to the yield and purity (i.e., freedom from quantities of the more readily hydrolyzable chlorosilane part) of the unhydrolyzed chlorosilane part. At the lower reaction temperatures longer reaction times are required than at the higher reaction temperatures in order to produce an unhydrolyzed chlorosilane part of a particular purity. When the amount of water employed in our process is greater than that required to stoichiometrically react with the more readily hydrolyzable chlorosilane part, longer reaction times tend to reduce the yield of the unhydrolyzed chlorosilane part because of hydrolysis. We have found that reaction times up to 20 hours can be used but prefer reaction times not greater than 3 hours.

Our process is especially useful in the purification of diorganodichlorosilanes that are contaminated by small but troublesome amounts of mono-organotrichlorosilanes. Diorganodichlorosilanes containing as little as 0.3 mole percent of mono-organodichlorosilane are not readily useful in manufacturing silicone elastomers. Diorganodichlorosilanes so purified are free from such amounts of the mono-organotrichlorosilane that prevent the ready conversion of said diorganodichlorosilanes to silicone gums which are satisfactory for use in the production of silicone elastomers. By way of illustration, a dimethyldichlorosilane that has been purified by this invention can be convereted to a gum which in turn can be converted to a useful silicone elastomer by the following process. The purified dimethyldichlorosilane is hydrolyzed and the hydrolyzate so produced is condensed. The condensed hydrolyzate is usually a dimethylpolysiloxane oil that is then mixed with a catalytic amount of a basic compound, such as potassium dimethylsilanolate. The mixture so formed is heated to a temperature sufficiently elevated to produce a gum. This gum is mixed with a filler, such as finely divided silica, and a curing catalyst, such as dibenzoyl peroxide, on a roll mill. The product of the roll mill is then heated to a temperature sufficiently elevated to cure it to produce a silicone elastomer.

Our process is also especially well suited to the purification of triorganichlorosilanes that are contaminated with tetrachlorosilane. The triorganochlorosilanes purified by this invention were found to be useful in producing end-blocker groups for silicone oils. By way of illustration, trimethylchlorosilane that has been purified by this invention may be used to produce end-blocker groups for silicone oils by the following process. Purified trimethylchlorosilane is hydrolyzed. The hydrolyzate so produced is condensed to form hexamethyldisiloxane. The hexamethyldisiloxane is mixed with a difunctional diorganopolysiloxane, such as a mixture of cyclic dimethylsiloxanes, and a basic catalyst, such as potassium dimethylsilanolate. The mixture so formed is heated to a temperature sufficiently elevated to cause the hexamethyldisiloxane and the difunctional diorganopolysiloxane to undergo an equilibration reaction to form a trimethylsiloxane end-blocked silicone oil.

This invention is useful in separating the mixtures of chlorosilanes produced by the disproportionation of organochlorosilanes.

The silanol, silanols, siloxane or siloxanes produced in this invention are also useful materials. By way of illustration, when a diorganopolysiloxane oil is produced in this invention it can be converted to a gum which in turn can be used to produce a silicone elastomer by the process described above for converting diorganopolysiloxane oils produced from dimethyldichlorosilane to a silicone elastomer.

The following examples are presented. In certain examples dealing with the purification of dimethyldichlorosilanes which are contaminated with methyltrichlorosilane, the amounts of methyltrichlorosilane were reduced so low by our process that conventional analytical methods, e.g., mass spectrophotometry, infrared analysis and quantitative analysis failed to provide dependable quantitative measurements. It can be said that conventional analytical methods usually are not precise when the amounts of methyltrichlorosilane are below about 0.1 mole percent. As an indication of dimethyldichlorosilane purity in these examples, the purified dimethyldichlorosilane is converted into a gum, the hardness and solubility of which is measured. It has been found that the hardness of this gum is directly proportional and its solubility is inversely proportional to the concentration of methyltrichlorosilane in the purified dimethyldichlorosilane from which said gum was made. By relating these values of hardness and solubility to similar values obtained from gums made from dimethyldichlorosilanes containing known concentrations of methyltrichlorosilanes, a good indication of purity can be obtained. For example, a cyclic polydimethylsiloxane containing predominantly the tetramer was divided into three portions. To the first portion 300 parts by weight of trifunctional polymethylsiloxane, $(MeSiO_{3/2})_x$, per million parts by weight of total siloxane were added. To the second portion 100 parts by weight of trifunctional polymethylsiloxane per million parts by weight of total siloxane were added and nothing was added to the third portion. The resulting mixtures were polymerized in the usual manner to form gums. The gum from the first portion did not dissolve even after 24 hours immersion in toluene. The gum from the second portion required 2½ hours immersion in toluene while the gum from the third portion dissolved after 1½ hours immersion in toluene. All portions were subjected to essentially the same conditions, prior to, during and subsequent to polymerization.

Wherever given in these examples, mole percentages are based on the aggregate number of moles of chlorosilanes contained by a particular chlorosilane mixture. Room temperatures referred to in the examples are temperatures of about 25° C. Average molecular weights of silicone oils were measured by determining the intrinsic viscosity of the silicone oil.

Example 1

A mixture was formed containing 0.7925 mole (95 mole percent) of dimethyldichlorosilane and 0.0417 mole (5 mole percent) of methyltrichlorosilane. This mixture was dissolved in 25 milliliters of dioxane. Ten milliliters of a solution containing 2.24 grams (0.124 mole) of water dissolved in dioxane were slowly added with stirring at room temperature to the dioxane solution of the silanes. A homogeneous solution formed. The solution was stirred for ½ hour. Hydrogen chloride formed and was removed from the solution by subjecting the solution to sub-atmospheric pressure. After the removal of the hydrogen chloride the solution was heated to 71° C. and a distillate was collected. Infrared analysis of the distillate so obtained showed that it contained 0.48 mole percent of methyltrichlorosilane and 99.52 mole percent of dimethyldichlorosilane by difference.

Example 2

Three hundred ninety-three and eight-tenths grams of a mixture that contained dimethyldichlorosilane (99.61 mole percent) and methyltrichlorosilane (.39 mole percent) as an impurity were dissolved in 600 cubic centimeters of dioxane. A solution containing 0.66 gram of water dissolved in 30 cubic centimeters of dioxane was added to the silane solution over a period of 45 minutes with stirring at 25° C. Hydrogen chloride formed and was removed by subjecting the reaction mixture to sub-atmospheric pressure. After the removal of the hydrogen chloride, the reaction mixture was heated to 71° C. and a distillate was collected. The fraction of the distillate that was collected when the reaction mixture was heated up to 71° C. was analyzed on a mass spectrometer and was found to contain purified dimethyldichlorosilane with about 0.06 to 0.07±0.04 mole percent of methyltrichlorosilane.

Example 3

One thousand, one hundred sixty-one grams of a mixture that contained dimethyldichlorosilane (99.79 mole percent) and methyltrichlorosilane (0.21 mole percent) as an impurity were dissolved in 1,700 cubic centimeters of the dimethyl ether of ethylene glycol. The solution so formed was cooled to −35° C. and a solution containing 2.13 grams of water dissolved in 100 cubic centimeters of the dimethyl ether of ethylene glycol was slowly added with stirring to the silane solution over a two-hour period. The total amount of water in the solution was equal to 3.3 moles of water per mole of methyltrichlorosilane. Hydrogen chloride formed during the addition and, after the addition was complete, was removed from the reaction mixture by subjecting the reaction mixture to sub-atmospheric pressure. The residue remaining after the removal of the hydrogen chloride was heated to 71° C. and a distillate was collected. The distillate was analyzed on a mass spectrometer and was found to contain purified dimethyldichlorosilane with only 0.05±0.04 mole percent of methyltrichlorosilane.

Example 4

Two hundred and fifty-eight grams of a chlorosilane mixture containing 99.61 mole percent dimethyldichlorosilane and 0.39 mole percent and methyltrichlorosilane were dissolved in 60 cubic centimeters of dioxane. To the resulting solution there were added at room temperature 25 cubic centimeters of an aqueous dioxane solution containing 0.137 gram of water. A homogeneous solution formed. After the addition of aqueous dioxane, the solution was stirred for one hour and then stripped under vacuum to remove hydrogen chloride that had formed. The residue after stripping was distilled through a packed column and all material boiling up to and including 72° C. was collected and analyzed. In this manner, 249.3 grams of purified dimethyldichlorosilane containing 0.07±0.04 mole percent methyltrichlorosilane as determined by infrared analysis was obtained. This amount of dimethyldichlorosilane represented a recovery of about 97 weight percent.

Example 5

One hundred twelve and nine-tenths grams of a previously purified mixture that contained dimethyldichlorosilane (99.9 mole percent) and methyltrichlorosilane (0.1 mole percent) as an impurity was dissolved in 53 cubic centimeters of dioxane. A solution containing 0.01224 gram of water dissolved in 8.7 cubic centimeters of dioxane was added dropwise with stirring at room temperature to the silane solution. After the addition of the dioxane-water solution was complete, the resulting reaction mixture was stirred for 0.5 hour and hydrogen chloride formed. The hydrogen chloride was removed from the reaction mixture by subjecting the reaction mixture to a sub-atmospheric pressure. After the removal of the hydrogen chloride the reaction mixture was heated to 72° C. and a distillate of purified dimethyldichlorosilane containing much less than 0.1 mole percent methyltrichlorosilane was collected.

Example 6

Another 393.8 grams sample of the mixture of dimethyldichlorosilane and methyltrichlorosilane used in Example 2 was dissolved in 600 cubic centimeters of dioxane and a solution containing 0.66 gram of water dissolved in 30 cubic centimeters of dioxane was slowly added thereto. The addition was performed at from −3° C. to 0° C. with continuous stirring. Hydrogen chloride formed and was removed from the reaction mixture by subjecting the reaction mixture to subatmospheric pressure. After the removal of the hydrogen chloride the reaction mixture was heated to 71° C. and a distillate was collected. The distillate was analyzed on a mass spectrometer and was found to contain purified dimethyldichlorosilane and about 0.04 to 0.05±0.04 mole percent of methyltrichlorosilane.

Example 7

Three hundred ninety-three and eight-tenths grams of a mixture that contained dimethyldichlorosilane (99.61 mole percent) and methyltrichlorosilane (0.39 mole percent) as an impurity were dissolved in a solution that contained 500 cubic centimeters of diethyl ether and 100 cubic centimeters of dioxane. To the solution so formed was added 0.66 gram of water dissolved in 30 cubic centimeters of dioxane. The dioxane water solution was added dropwise over a period of 45 minutes at room temperature with stirring. Hydrogen chloride formed and was separated from the reaction mixture by subjecting the reaction mixture to sub-atmospheric pressure. After the hydrogen chloride had been removed the residue so produced was heated to 71° C. and a distillate was collected. The distillate was analyzed using infrared techniques and was found to contain purified dimethyldichlorosilane with much less than 0.1 mole percent of methyltrichlorosilane.

Example 8

A sample of the purified dimethyldichlorosilane obtained as a distillate in Example 3 was dissolved in isopropyl ether. The resulting solution was added dropwise to a mixture containing ice and isopropyl ether. The addition was performed at a temperature of −5° C. and after the addition was complete the reaction mixture so formed was stirred for one hour. An oil was obtained, was separated from the reaction mixture and then was washed three times with separate portions of water. The oil was then mixed with sodium bicarbonate to remove the residual chlorine. Sodium chloride formed and, along with the excess sodium bicarbonate, was removed from the oil by washing with water. The oil was then dissolved in toluene. Isopropyl ether and water were removed from the resulting toluene solution by distillation. The toluene solution was then refluxed in the presence of potassium carbonate. The potassium carbonate was thereupon removed from the solution by filtration and the toluene was distilled leaving a residue. The residue was an oil having the average molecular weight listed in the table below.

Following the above procedure the dimethyldichlorosilanes obtained as distillates in Examples 5, 6 and 7 were hydrolyzed to form oils of average molecular weights listed in said table.

Forty-two and four-tenths grams of the oil produced from the dimethyldichlorosilane distillate obtained in Example 3 were mixed with enough potassium dimethylsilanolate so that the resulting mixture contained 110 p.p.m. of potassium (i.e., parts by weight of potassium per million parts by weight of the oil). The oil-silanolate mixture was heated for two hours at 150° C. to form a slightly more viscous oil. Sufficient potassium dimethylsilanolate was added to this oil to provide an additional 50 p.p.m. of potassium and the mixture was heated for 16 hours at 150° C. A more viscous oil formed. The oil was again heated for 16 hours at 150° C. to form a gum that was completely soluble in dimethyl ether.

The oils obtained from the dimethyldichlorosilane distillates produced in Examples 5, 6 and 7 were converted to gums using the procedure described for the conversion of the dimethyldichlorosilane distillate made in Example 3. Gums having the following properties were obtained.

| Oil From Me$_2$SiCl$_2$ of Example | Average Molecular Weight of Oil | Total Potassium Dimethyl-silanolate (p.p.m. of K) | Polymerization Time (Hours) | Gum |
|---|---|---|---|---|
| 4 | 498 | 150 | 48 | Partly soluble in diethyl ether. |
| 5 | 423 | 260 | 34 | Completely soluble in dimethyl ether. |
| 6 | 438 | 275 | 82 | Partly soluble in diethyl ether. |
| 7 | 391.5 | 275 | ------ | Completely soluble in diethyl ether. |

Example 9

Three elastomers were prepared, respectively, from 100 parts by weight of each of the gums prepared in Example 8 from the dimethyldichlorosilanes of Examples 5 and 7 and a gum prepared from a dimethyldichlorosilane, unpurified by our process, and containing about 0.28±0.04 mole percent of methyltrichlorosilane, 40 parts by weight of a finely-divided silica filler and two parts by weight of dibenzoyl peroxide. The ingredients for each elastomer were milled on a two-roll 6″ x 12″ laboratory mill at a temperature of 25° C. The milling was conducted over a period of 10 minutes and the milled materials so formed were placed in a mold and cured at 135° C. for 10 minutes. Elastomers were obtained from each gum. The properties of the elastomers are correspondingly listed in the table below. The gums obtained from purified dimethyldichlorosilanes were easily processed and formed valuable elastomers. The gum made from unpurified dimethyldichlorosilane, however, was not easily processed and formed a poorer elastomer.

| Gum | Elastomer Properties | | | | |
|---|---|---|---|---|---|
| Me$_2$SiCl$_2$ Source | Solubility | Tensile Strength (p.s.i.) | Elongation, Percent | Miniature Penetrometer Reading Hardness (mm./10 sec.) | Set/Percent |
| Example 5 | Soluble | 420 | 259 | 38 | 0 |
| Example 7 | do | 652 | 300 | 38 | 0 |
| Unpurified | Insoluble | 255 | 230 | 50 | 5 |

Example 10

Crude MeSiCl obtained by distilling the reaction product of methyl chloride and silicon was redistilled and 400 grams of material boiling from 54° C. to 60° C. was collected. This cut was analyzed in the mass spectrometer and ratios of chlorosilanes found are entered in the first line of the table below. A solution of 245 grams of this chlorosilane mixture in 696 grams of dioxane was prepared and cooled to 0° C. To this solution were added, with stirring, 4.3 grams of water in 100 cubic centimeters of dioxane. The addition was made over a two-hour period during which time the reaction mixture was kept cool in an ice water bath. The number of moles of water used for the hydrolysis was 1½ times half the total number of moles of MeSiCl$_3$ and SiCl$_4$ in the 245 gram sample of chlorosilan. The mixture was distilled to recover the chlorosilanes. The results of this distillation are shown in the table below. The process can be performed again on the purified trimethylchlorosilane to effect a further removal of the polyfunctional chlorosilanes.

| | B. P. Range, °C. | Weight (Grams) | Molar Composition of Chlorosilane | | | | |
|---|---|---|---|---|---|---|---|
| | | | Me$_3$SiCl | Me$_2$SiCl$_2$ | MeSiHCl$_2$ | MeSiCl$_3$ | SiCl$_4$ |
| Orig. Dist. Sample | 54-60 | 245 | 1 | 0.069 | 0.284 | 0.209 | 0.105 |
| Purified Mixture—Fraction No.: | | | | | | | |
| 1 | 45-52 | 50 | 1 | (¹) | 0.0611 | 0.0199 | (¹) |
| 2 | 52-58 | 49 | 1 | (¹) | 0.0195 | 0.0348 | (¹) |
| 3 | 58-60 | 23 | 1 | 0.0023 | 0.0153 | 0.0597 | (¹) |
| 4 | 60-85 | 14 | 1 | 0.0297 | 0.0201 | 0.2150 | (¹) |
| Weighted Average | | | 1 | 0.00345 | 0.0341 | 0.0521 | 0.00 |

¹ Non detectable.

What is claimed is:

1. A process for separating a chlorosilane mixture containing a first chlorosilane part and a second chlorosilane part, the first chlorosilane part being more readily hydrolyzable than the second chlorosilane part, said process comprising bringing said chlorosilane mixture into intimate reactive contact with not less than 0.5 mole of water per mole of the first chlorosilane part, reacting said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane parts.

2. A process for separating a chlorosilane mixture containing a first chlorosilane part and a second chlorosilane part, the first chlorosilane part being more readily hydrolyzable than the second chlorosilane part, said process comprising bringing said chlorosilane mixture into intimate reactive contact with 0.5 to 5 moles of water per mole of the first chlorosilane part, reacting said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

3. A process for separating a chlorosilane mixture containing a first chlorosilane part and a second chlorosilane part, the first chlorosilane part being more readily hydrolyzable than the second chlorosilane part, said process comprising bringing said chlorosilane mixture into intimate reactive contact with not less than 0.5 mole of water per mole of the first chlorosilane part, reacting at $-40°$ C. to $+30°$ C. said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane parts.

4. A process for separating a chlorosilane mixture containing a first chlorosilane part and a second chlorosilane part, the first chlorosilane part being more readily hydrolyzable than the second chlorosilane part, said process comprising bringing said chlorosilane mixture into intimate reactive contact with 0.5 to 5 moles of water per mole of the first chlorosilane part, reacting at $-40°$ C. to $+30°$ C. said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

5. A process for separating a chlorosilane mixture containing a first chlorosilane part and a second chlorosilane part, the first chlorosilane part being more readily hydrolyzable than the second chlorosilane part, said process comprising dissolving in a solvent said chlorosilane mixture and not less than 0.5 mole of water per mole of the first chlorosilane part, reacting said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

6. A process for separating a chlorosilane mixture containing a first chlorosilane part and a second chlorosilane part, the first chlorosilane part being more readily hydrolyzable than the second chlorosilane part, said process comprising dissolving in a solvent said chlorosilane mixture and 0.5 to 5.0 moles of water per mole of the first chlorosilane part, reacting said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

7. A process for separating a chlorosilane mixture containing a first chlorosilane part and a second chlorosilane part, the first chlorosilane part being more readily hydrolyzable than the second chlorosilane part, said process comprising dissolving in a solvent said chlorosilane mixture and not less than 0.5 mole of water per mole of the first chlorosilane part, reacting at $-40°$ C. to $+30°$ C. said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

8. A process for separating a chlorosilane mixture containing a first chlorosilane part and a second chlorosilane part, the first chlorosilane part being more readily hydrolyzable than the second chlorosilane part, said process comprising dissolving in a solvent said chlorosilane mixture and 0.5 to 5.0 moles of water per mole of the first chlorosilane part, reacting at $-40°$ C. to $+30°$ C. said chlorosilane mixture and water for a period of time less than that required to completely hydrolyze all chlorosilanes in said mixture thereby forming a hydrolyzed chlorosilane part and an unhydrolyzed chlorosilane part, and separating the unhydrolyzed and hydrolyzed chlorosilane part.

9. A process for separating a chlorosilane mixture containing a first cholrosilane and a second chlorosilane, the first chlorosilane being more readily hydrolyzable than the second chlorosilane, said process comprising dissolving in a solvent said chlorosilane mixture and not less than 0.5 mole of water per mole of the first chlorosilane, reacting said chlorosilane mixture and water for a period of time less than the required to completely hydrolyze all chlorosilanes in said mixture thereby forming a hydrolyzed chlorosilane and an unhydrolyzed chlorosilane, and separating the unhydrolyzed and hydrolyzed chlorosilanes.

10. A process for separating a chlorosilane mixture containing a first chlorosilane and a second chlorosilane, the first chlorosilane being more readily hydrolyzable than the second chlorosilane, said process comprising dissolving in a solvent said chlorosilane mixture and 0.5 to 5.0 moles of water per mole of the first chlorosilane, reacting said chlorosilane mixture and water for a period of time less than that required to completely hydrolyze all chlorosilanes in said mixture thereby forming a hydrolyzed chlorosilane and an unhydrolyzed chlorosilane, and separating the unhydrolyzed and hydrolyzed chlorosilanes.

11. A process for separating a chlorosilane mixture containing a first chlorosilane and a second chlorosilane, the first chlorosilane being more readily hydrolyzable than the second chlorosilane, said process comprising dissolving in a solvent a chlorosilane mixture and not less than 0.5 mole of water per mole of the first chlorosilane, reacting at $-40°$ C. to $+30°$ C. said chlorosilane mixture and water for a period of time less than that required to completely hydrolyze all chlorosilanes in said mixture thereby forming a hydrolyzed chlorosilane and an unhydrolyzed chlorosilane, and separating the unhydrolyzed and hydrolyzed chlorosilanes.

12. A process for separating a chlorosilane mixture containing a first chlorosilane and a second chlorosilane, the first chlorosilane being more readily hydrolyzable than the sceond chlorosilane, said process comprising dissolving in a solvent said chlorosilane mixture and 0.5 to 5.0 moles of water per mole of the first chlorosilane, reacting at $-40°$ C. to $+30°$ C. said chlorosilane mixture and water for a period of time less than that required to completely hydrolyze all chlorosilanes in said mixture thereby forming a hydrolyzed chlorosilane and an unhydrolyzed chlorosilane, and separating the unhydrolyzed and hydrolyzed chlorosilanes.

13. A process for separating a chlorosilane mixture containing a trichlorosilane and a dichlorosilane, the trichlorosilane being more readily hydrolyzable than the dichlorosilane, said process comprising dissolving in a solvent said chlorosilane mixture and not less than 0.5 mole of water per mole of the trichlorosilane, reacting the chlorosilane mixture and water for a period of time less than that required to completely hydrolyze all chlorosilanes in said mixture thereby forming hydrolyzed trichlorosilane and unhydrolyzed dichlorosilane, and separating said unhydrolyzed and hydrolyzed chlorosilanes.

14. A process for separating a chlorosilane mixture containing a trichlorosilane and a dichlorosilane, the trichlorosilane being more readily hydrolyzable than the dichlorosilane, said process comprising dissolving in a solvent said chlorosilane mixture and 0.5 to 5.0 moles of water per mole of the trichlorosilane, reacting the chlorosilane mixture and water for a period of time less than that required to completely hydrolyze all chlorosilanes in said mixture thereby forming hydrolyzed trichlorosilane and unhydrolyzed dichlorosilane, and separating said unhydrolyzed and hydrolyzed chlorosilanes.

15. A process for separating a chlorosilane mixture containing a trichlorosilane and a dichlorosilane, the trichlorosilane being more readily hydrolyzable than the dichlorosilane, said process comprising dissolving in a solvent said chlorosilane mixture and 0.5 to 5.0 moles of water per mole of the trichlorosilane, reacting at −40° C. to +30° C. the chlorosilane mixture and water for a period of time less than that required to completely hydrolyze all chlorosilanes in said mixture thereby forming hydrolyzed trichlorosilane and unhydrolyzed dichlorosilane, and separating said unhydrolyzed and hydrolyzed chlorosilanes.

16. A process for separating a chlorosilane mixture containing a polychlorosilane part and a monochlorosilane, the polychlorosilane part being more readily hydrolyzable than the monochlorosilane, said process comprising dissolving in a solvent said chlorosilane mixture and not less than 0.5 mole of water per mole of the polychlorosilane part, reacting the chlorosilane mixture and water for a period of time less than that required to completely hydrolyze all chlorosilanes in said mixture thereby forming hydrolyzed polychlorosilane and unhydrolyzed monochlorosilane, and separating said unhydrolyzed and hydrolyzed chlorosilanes.

17. A process for separating a chlorosilane mixture containing a polychlorosilane part and a monochlorosilane, the polychlorosilane part being more readily hydrolyzable than the monochlorosilane, said process comprising dissolving in a solvent said chlorosilane mixture and 0.5 to 5.0 moles of water per mole of the polychlorosilane part, reacting the chlorosilane mixture and water for a period of time less than that required to completely hydrolyze all chlorosilanes in said mixture thereby forming hydrolyzed polychlorosilane and unhydrolyzed monochlorosilane, and separating said unhydrolyzed and hydrolyzed chlorosilanes.

18. A process for separating a chlorosilane mixture containing a polychlorosilane part and a monochlorosilane, the polychlorosilane part being more readily hydrolyzable than the monochlorosilane, said process comprising dissolving in a solvent said chlorosilane mixture and 0.5 to 5.0 moles of water per mole of the polychlorosilane part, reacting at −40° C. to +30° C. the chlorosilane mixture and water for a period of time less than that required to completely hydrolyze all chlorosilanes in said mixture thereby forming hydrolyzed polychlorosilane and unhydrolyzed monochlorosilane, and separating said unhydrolyzed and hydrolyzed chlorosilanes.

19. A process for separating a chlorosilane mixture containing methyltrichlorosilane and dimethyldichlorosilane, comprising dissolving in a solvent the chlorosilane mixture and not less than 0.5 mole of water per mole of methyltrichlorosilane, reacting the chlorosilane mixture and water for a period of time less than that required to completely hydrolyze all chlorosilanes in said mixture thereby forming hydrolyzed methyltrichlorosilane and unhydrolyzed dimethyldichlorosilane, and separating the unhydrolyzed and hydrolyzed chlorosilanes.

20. A process for separating a chlorosilane mixture containing a polychlorosilane part of dimethyldichlorosilane, methyltrichlorosilane and tetrachlorosilane, and trimethylchlorosilane, said process comprising dissolving in a solvent said chlorosilane mixture and not less than 0.5 mole of water per mole of the polychlorosilane part reacting the chlorosilane mixture and water for a period of time less than that required to completely hydrolyze all chlorosilanes in said mixture thereby forming hydrolyzed polychlorosilanes and unhydrolyzed trimethylchlorosilane, and separating the unhydrolyzed and hydrolyzed chlorosilanes.

21. The process for obtaining a diorganodichlorosilane having the formula RR'SiCl$_2$ of greater purity from mixtures of the latter and an organotrichlorosilane having the formula RSiCl$_3$ in which the organotrichlorosilane comprises at most about 5.5 weight percent based on the total weight of the diorganodichlorosilane and the organotrichlorosilane, where R and R' are monovalent hydrocarbon radicals, which process comprises adding to the aforesaid mixture of the diorganodichlorosilane and organotrichlorosilane a solution of water and an organic ether solvent miscible with both the water and the aforesaid chlorosilanes, the amount of water being substantially less than that required to hydrolyze the diorganodichlorosilane and being present in an amount equal to from 0.5 to 4 moles of water per moles of the organotrichlorosilane and the amount of organic ether solvent being within the range of from about 3 to 50 moles of the organic ether solvent per mole of water, and thereafter recovering the diorganodichlorosilane of greater purity.

22. The process for obtaining purified trimethylchlorosilane from mixtures of the latter with a mixture of methyltrichlorosilane and silicon tetrachloride wherein the trimethylchlorosilane is present in larger amounts by weight than the other chlorosilanes, which process comprises adding to the aforesaid mixture of trimethylchlorosilane, methyltrichlorosilane and silicon tetrachloride a solution of water and an organic ether solvent miscible with both the water and the aforesaid chlorosilanes, the amount of water in the organic ether solvent being substantially less than that required to hydrolyze completely the chlorosilanes containing more than one silicon-bonded chlorine atom in its molecule, the moles of organic ether solvent being greater than the moles of water present, and thereafter recovering trimethylchlorosilane of greater purity.

23. The process for obtaining purified trimethylchlorosilane from mixtures of the latter with at least one chlorosilane selected from the class consisting of methyltrichlorosilane and silicon tetrachloride, wherein the trimethylchlorosilane is present in larger amounts by weight than the other other chlorosilane, which process comprises adding to the aforesaid mixture of trimethylchlorosilane and the other chlorosilane a solution of water and an organic ether solvent miscible with both the water and the aforesaid other chlorosilane, the amount of water in the organic ether solvent being substantially less than that required to hydrolyze completely the other chlorosilane containing more than one silicon-bonded chlorine atom in its molecule, the moles of organic ether solvent being greater than the moles of water present, and thereafter recovering trimethylchlorosilane of greater purity.

References Cited in the file of this patent

UNITED STATES PATENTS

| 2,265,962 | Bent et al. | Dec. 9, 1941 |
| 2,486,162 | Hyde | Oct. 25, 1949 |
| 2,519,926 | Patnode et al. | Aug. 22, 1950 |

FOREIGN PATENTS

| 824,050 | Germany | Dec. 10, 1951 |

OTHER REFERENCES

Alfrey et al.: "Jr. Polymer Science," vol. 1 (1946), pp. 102–120, pp. 103–105 only needed.